Nov. 16, 1926.  
F. C. FANTZ  
PIPE COUPLING  
Filed August 7, 1925

1,607,254

Fred C. Fantz  
Inventor

By Dodson & Roe  
Attorneys

Patented Nov. 16, 1926.

1,607,254

UNITED STATES PATENT OFFICE.

FRED C. FANTZ, OF WEBSTER GROVES, MISSOURI, ASSIGNOR TO MIDWEST PIPING & SUPPLY CO., OF ST. LOUIS, MISSOURI, A CORPORATION OF MISSOURI.

PIPE COUPLING.

Application filed August 7, 1925. Serial No. 48,700.

My invention relates to the art of joining the mating ends of pipe sections which form conduits, or the like, for the conveying of gases or liquids, and has for its object to provide a construction which will be strong and durable and will be practically self-seating in a continuous line of contact, circumferentially, of the mating ends of two adjacent pipe sections when the operator simply tightens the connecting bolts.

A further object is to provide such a construction as indicated above which will also permit of slight angular adjustments between pipe sections, for such is not only desirable, but in many cases essential.

A further and most important object is to provide such a construction as indicated above in which there will be a substantially continuous unbroken line of the inner wall of the completed conduit, so that there will be no obstruction whatsoever to the flow of the gases or liquids which are usually under pressure in going through the conduit.

A further object is to provide such a construction particularly adapted for utilization in conduits conveying liquids or gases which are under what is known as very high pressure.

A further object is to provide a locking means for my pipe joints in which the elements are practically self-seating, and not dependent upon careful adjustment by the operator, in the assembly of the parts.

Figure 1:
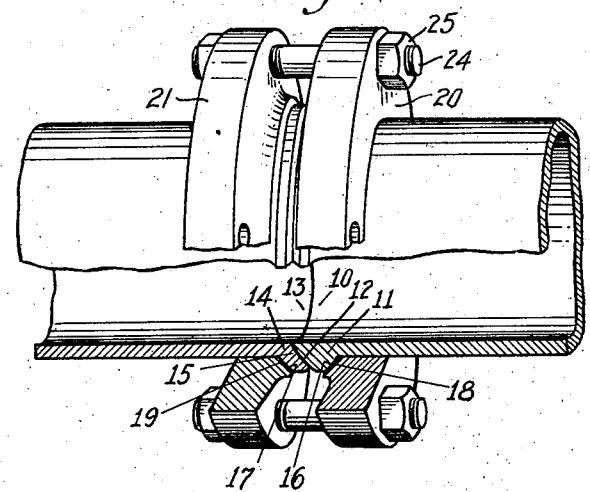
Figure 2:
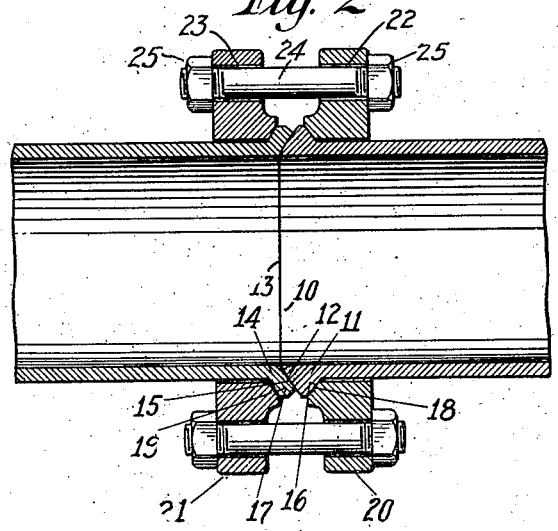

My invention consists of the details of construction hereinafter set forth, pointed out in my claims, and illustrated in the accompanying drawings, in which Fig. 1 shows a perspective view of portions of adjacent pipe ends as they are assembled and mated under my invention;

Fig. 2 shows a longitudinal sectional view of the same.

Referring to the accompanying drawings, reference numeral 10 is used to indicate the end of one pipe section which is formed with an upwardly extending flange 11 surrounding the outer surface of the said end. The flange 11 being formed, as is shown and described, causes the said pipe end to be of much greater thickness than the wall of the pipe, and the mating face of this pipe end extends from near the outer edge of the said flange 11 to the inner wall of the pipe, and this face, on the female member, is arcuately concave, as shown at 12. By this construction, it is obvious a seating space of considerable area is formed on this mating end.

The numeral 13 indicates the mating pipe section (which in this description is the male end) which is likewise formed with a flange 14 to mate with the flange 11; and the face, indicated at 15, on this male flange is arcuately convex, so as to perfectly mate with the concave face on the female end. The two flanges 11 and 14 are each formed with their rear face arcuately convex, as shown at 16 and 17 respectively, so as to receive the arcuate concave mating surfaces 18 and 19, formed on the annuli 20 and 21, respectively, so as to provide proper seating therefor. The annuli, as shown, fit around the periphery of the pipe sections, and are provided with the arcuate concave surfaces 18 and 19, to mate with the arcuate convex surfaces 16 and 17 respectively. The flanges are also provided with a multiplicity of transverse orifices 22 and 23, respectively, to receive the bolts 24.

By my construction, the flanges 11 and 14 provide not only greater thickness at the end of the mating pipe sections, so as to provide strength, but provide a much greater surface area for the mating surfaces. The female end is concave and arcuate, the male end being convex and arcuate, the two surfaces being milled to fit perfectly. The construction is also such that when the two ends are mated, there will be a continuous even line for the inner wall between the pipe sections and no obstruction permitted for the free flowing of the liquids, gases, or contents of the conduit. These arcuate mating surfaces also provide for slight angular adjustments between the mating ends of pipe sections.

A most important part of my invention is the forming of that surface of the flanges 11 and 14 which receives their respective annuli on an arcuate configuration, and the surfaces of the respective annuli which fit against the same are, obviously, also arcuate. This makes it possible to seat the various parts constituting my coupling firmly in their respective positions, even if an angular adjustment is made between mating pipe ends.

In practical operation, the two pipe ends are placed in contact with each other and, by my construction, cannot avoid automatically taking their proper seat, and this is a fact even if a slight angular adjustment is desired between the mating sections. The annulus for each pipe section is then moved to its position and cannot avoid taking its proper seat against the pipe section and the arcuate surfaces 16 and 17, respectively. The annulus rotates freely on the pipe end and the orifices are placed in proper alignment. The bolts 24 are then passed through the registering orifices and the nuts 25 drawn up until all the parts are firmly and tightly seated together and by this means are held in such position permanently.

By my construction it is unnecessary to employ the use of a gasket, and all expansion stresses and bolting strains are taken up automatically.

I am aware that many devices for like purposes have been produced and utilized, but in my experience I have never found a construction which combines arcuate mating surfaces formed with enlarged bearing area at the mating ends of male and female members where the continuity of the inner wall of the conduit had been preserved and the mating ends held in immovable position by the utilization of self-seating annuli which are also adjustable to angular conditions, each annulus freely rotating to any desired position on its respective pipe end, so as to be in alignment with its mating annulus to receive the connecting bolt, each annulus having a continuous bearing space around its respective pipe and against its respective flange.

Having thus described my invention, what I claim as new and desire to secure by Letters Patent of the United States is:

1. A pipe coupling, comprising pipe sections formed with flanges at adjacent ends, one flange having an arcuate concave contacting surface, the other end having an arcuate convex contacting surface to abut the aforesaid concave surface, the said mating surfaces having a substantially uniform contact with each other over substantially their entire surface, said pipe sections having substantially the same inner diameter, the contacting ends forming a substantially unbroken continuity of surface of the inner wall, with means to hold the sections firmly seated together.

2. A pipe coupling, comprising pipe sections formed with flanges at adjacent ends, one flange having an arcuate concave contacting surface, the other end having an arcuate convex contacting surface to abut the aforesaid concave surface, said pipe sections having substantially the same inner diameter, the contacting ends forming a substantially unbroken continuity of surface of the inner wall, the said mating surfaces having a substantially uniform contact with each other over substantially their entire surface, the said flanges being formed with arcuate convex surfaces on their outer sides, an annulus around each pipe section and provided with a concave arcuate surface adapted to seat against the convex arcuate surfaces on their respective flanges, means to lock the annuli in stationary position firmly holding the mating elements together.

3. A pipe coupling, comprising pipe sections provided with flanges at their adjacent ends, one flange having an arcuate convex surface and the other flange having a concave surface to abut the convex surface for mating the pipe sections, the said mating surfaces having a substantially uniform contact with each other over substantially their entire surface, said pipe sections having substantially the same inner diameter, the contacting ends forming a substantially unbroken continuity of surface of the inner wall, an annulus around each pipe end there being transverse orifices therethrough, a seating surface on each annulus to continuously engage the flange on its respective pipe end, bolts passing through the orifices in the annuli to draw the pipe ends together.

FRED C. FANTZ.